United States Patent [19]

Kolbanovsky et al.

[11] 4,412,552

[45] Nov. 1, 1983

[54] METHOD OF CONTROLLING INLET VALVES OF COMPRESSION REACTOR AND DEVICE FOR EFFECTING SAME

[75] Inventors: July A. Kolbanovsky, Moscow; Romeo V. Tsagareli, Tbilisi; Viktor S. Schipachev, Moscow, all of U.S.S.R.

[73] Assignee: Institut Neftekhimicheskogo Sinteza Imeni A.V. Topchieva Akademii Nauk SSSR, U.S.S.R.

[21] Appl. No.: 336,372

[22] PCT Filed: May 5, 1980

[86] PCT No.: PCT/SU80/00076

§ 371 Date: Dec. 24, 1981

§ 102(e) Date: Dec. 24, 1981

[87] PCT Pub. No.: WO81/03130

PCT Pub. Date: Nov. 12, 1981

[51] Int. Cl.³ .............................................. B01J 3/00
[52] U.S. Cl. .................................. 137/14; 137/487.5; 60/525; 422/198
[58] Field of Search ................. 137/1, 14, 565, 487.5; 60/525; 422/198; 123/46 R; 417/349

[56] References Cited

U.S. PATENT DOCUMENTS 2,814,551 11/1957 Broeze .................................. 60/525

FOREIGN PATENT DOCUMENTS 1528905 5/1968 France .
2320136 4/1977 France .
1444475 7/1976 United Kingdom .
435843 5/1974 U.S.S.R. .

Primary Examiner—Alan Cohan
Attorney, Agent, or Firm—Steinberg & Raskin

[57] ABSTRACT

A method of controlling inlet valves of a compression reactor consists in that in the process of operation of the reactor 1 pressure in its working spaces 4, 5 and supply lines 7, 6 is continuously measured, the sign of a pressure differential (ΔP) between said working spaces 4, 5 and the respective supply lines 7, 6 is determined, at the instant the sign of the pressure differential (ΔP) changes from "minus" to "plus" a command to relieve the inlet valves 8, 9 of all control actions, except the pressure differential, is produced, and at the instant the sign of the pressure differential (ΔP) changes from "plus" to "minus" a command to read a preset time interval (τ) is supplied, at the expiration of which interval a command to close the inlet valves 8, 9 of the reactor 1 is produced. A device for controlling inlet valves of a compression reactor comprises drives 10, 11 actuating the inlet valves 8, 9 of the reactor 1, pressure pickups 14, 15, 16, 17 arranged in the working spaces 4, 5 and in the supply lines 6, 7, comparators 18, 19 connected to the outputs of the pickups 14, 15, 16, 17, units 12, 13 to control the drives 10, 11, the inputs of which are connected through time relays 20, 21 to the outputs of the comparators 18, 19 and the outputs of which are connected to the drives 10, 11, and a chronometer 22 connected with one of the comparators 18, 19.

4 Claims, 2 Drawing Figures

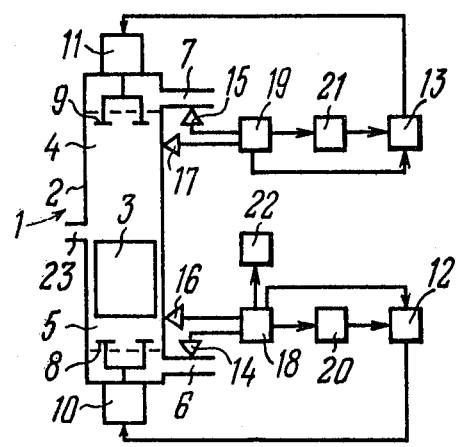
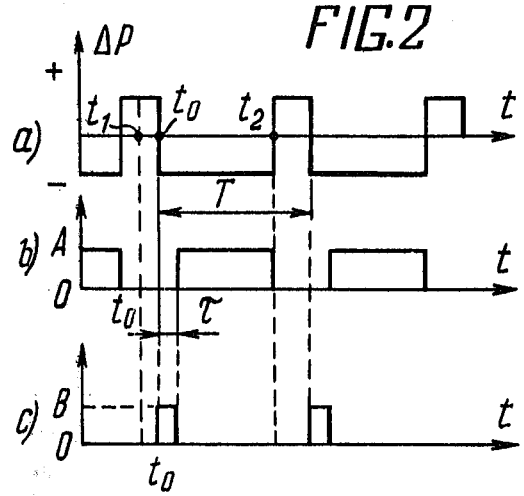

METHOD OF CONTROLLING INLET VALVES OF COMPRESSION REACTOR AND DEVICE FOR EFFECTING SAME

TECHNICAL FIELD

The invention relates to the field of chemical engineering and more particularly to methods of controlling inlet valves of a compression reactor and to devices for effecting the same.

BACKGROUND ART

Known in the art is a method of controlling valves of a compression reactor of a free-piston type (cf. U.S. Pat. No. 2,814,551, published Nov. 26, 1957, Cl. 23-1). As disclosed in this patent, the method of controlling valves of a compression reactor is performed by alternately opening and closing the compression reactor inlet valves, which normally open into the reactor.

The inlet valves are opened and closed by electromagnets each time the piston occupies a predetermined position.

However, when this prior art method is employed, great difficulties arise in starting up the compression reactor as in the process of starting, as well as changing the modes of operation, the valves should open and close with the piston occupying the positions which differ from those occupied by the piston during the steady opertion of the reactor.

Besides, as experiments showed, this prior art method of controlling valves of a compression reactor fails to ensure the stable operation of the reactor with the gas pressure fluctuating at the inlet and outlet of the reactor.

Such fluctuations, within certain limits, generally occur in practice during the operation of a compression reactor in any chemical production line.

Known in the art is a device for controlling a compression reactor (cf. U.S. Pat. No. 2,814,551, published Nov. 26, 1957, Cl. 23-1), comprising drives actuating inlet valves of the compression reactor and made in the form of an electromagnet rigidly connected with the inlet valves.

The electromagnets of the drives actuating the inlet valves are connected to drive control units designed to produce control signals for energizing the electromagnets. The drive control units include a mechanical device rigidly coupled with a piston and determining its coordinate. This prior art device for controlling valves of a compression reactor carries out control over a steady operation of the reactor by way of supplying gas into each working space of the reactor when the piston is in the predetermined positions and ceasing the gas supply with the piston occupying another position.

This is ensured due to the opening and closing of the inlet valves which open into the working space under the action of the electromagnets energized in response to a signal supplied by the respective drive control unit.

The drive control unit produces said signal at the instant its mechanical device for determining the piston coordinate registers the predetermined position of the piston freely reciprocating inside the reactor and separating two working spaces from each other.

However, this device interferes with the sealing of the reactor working spaces as the piston is mechanically associated with the drive control units arranged outside the reactor. The absence of a reliable sealing is especially harmful in the case the compression reactor handles hypertoxic and gaseous mixtures, as well as gaseous mixtures self-igniting in the air.

In addition, the heretofore described device opens and closes the reactor inlet valves depending only on the piston position and irrespective of the actual pressures existing in the working spaces and supply lines, at which it is indeed necessary to start or cease the gas supply into the working spaces from the supply lines. To ensure the stable operation of the compression reactor, the inlet valves should be opened and closed depending on the relation between the pressures in the working spaces and in the respective supply lines.

DISCLOSURE OF THE INVENTION

The invention is essentially aimed at providing such a method of controlling inlet valves of a compression reactor and such a device for effecting the same which would ensure the stable operation of the compression reactor both under steady-state and transient conditions by way of continuously measuring the relation between the pressures in each working space of the reactor and in the respective supply line, and opening and closing the inlet valves of the reactor each time said relations between the pressures reach the predetermined values, irrespective of the reactor piston coordinate.

This aim is attained by that in a method of controlling a compression reactor by way of opening and closing inlet valves of the compression reactor according to the invention in the process of the compression reactor operation the sign of a pressure differential $\Delta P$ between the gas in the working space of the compression reactor and the gas in the respective supply line is determined, at the instant the sign of the pressure differential $\Delta P$ changes from "minus" to "plus" a command to relieve the inlet valves of all control actions keeping the inlet valves in a closed state is produced, and at the instant the sign of the pressure differential $\Delta P$ changes from "plus" to "minus" a command to read a preset time interval $\tau$ is produced, at the expiration of which a command to close the inlet valves of the compression reactor and to keep them in a closed state is supplied.

It is expedient that in the method of controlling inlet valves of a compression reactor according to the invention at the instant the sign of the pressure differential $\Delta P$ changes from "minus" to "plus" a change-of-sign period $T$ of the pressure differential between the working space and the respective supply line is measured, and the value of the preset time interval $\tau$ is selected within the range from 0.05 T to 0.3 T.

Preferably, in the method of controlling a compression reactor, in order to set up given steady-state conditions, according to the invention in the process of the compression reactor operation the value of the period T is measured, compared with the predetermined value of a change-of-sign period $T_n$ of the pressure differential, determining the given steady-state conditions of the reactor and, in the case of inequality of these values of the periods T and $T_n$, the value of the time interval $\tau$ is changed within the range from 0.05 T to 0.3 T, then the new value of a change-of-sign period $T_i$ of the pressure differential is measured and compared with the predetermined value of the period $T_n$, which operation is repeated until the values of the predetermined change-of-sign period $T_n$ and the measured change-of-sign period $T_i$ of the pressure differential between the working space and the supply line coincide.

This aim is also attained by that in a device for controlling inlet valves of a compression reactor, comprising drives actuating the reactor inlet valves and drive control units connected to the drives and associated with the reactor according to the invention there are provided pressure pickups arranged in working spaces of the reactor in close proximity to its bottoms and in supply lines and having their outputs connected, via a respective comparator and a time relay connected in series, to an input of the respective control unit of the drive actuating the inlet valves, the other input of which is connected with one of the outputs of the respective comparator, and the output of which is connected to the respective drive actuating the inlet valves, one of the comparators being connected to a chronometer.

The proposed method and device for controlling inlet valves of a compression reactor ensure the stable operation of the compression reactor under various conditions and increase its efficiency as control signals are produced by the control unit of the drive actuating the inlet valves at the instants the sign of a pressure differential between the gas in each of the working spaces and the gas in the respective supply lines changes and owing to this pressure differential.

The proposed method takes into account actual relation between the gas parameters in the supply lines and the working spaces of the reactor in the process of every working cycle, the instants of the opening and closing of the valves being not uniquely dependent on the piston position due to which with the pressure changing at the inlet and outlet of the reactor and under changing operating conditions the proposed method ensures the stable operation of the reactor.

There is no mechanical connection between the piston and the device for controlling the reactor which provides for better sealing of the reactor working spaces.

The method of controlling inlet valves of a compression reactor and the device effecting the same automatically take into account all pressure variations at the inlet and outlet of the compression reactor and any change in operating conditions thereof at starting and make it possible to maintain the operating parameters of the reactor under steady-state conditions with a high precision.

Realization of the proposed method and device for controlling inlet valves of a reactor is possible with the use of the known automatic equipment.

BRIEF DESCRIPTION OF THE DRAWINGS

FIG. 1 depicts a compression reactor with a block-diagram of a device for controlling its inlet valves, according to the invention;

FIG. 2 presents time diagrams illustrating operation of the device and compression reactor, according to the invention.

BEST MODE OF CARRYING OUT THE INVENTION

The proposed method of controlling inlet valves of a compression reactor is performed in a device an embodiment of which is shown in FIG. 1.

FIG. 1 also diagrammatically shows a compression reactor 1 of a free-piston type, comprising a cylinder 2 internally accommodating a free piston 3 dividing the interior of the cylinder 2 into two working spaces 4 and 5, and in the process of operation reciprocating in the cylinder 2. Gaseous reactants are supplied to the working spaces 4 and 5 through supply lines 6 and 7 and inlet valves 8 and 9 which open into the working spaces 5 and 4, respectively, and are located in the bottoms of the reactor 1.

The device for controlling the compression reactor 1 comprises power drives 10 and 11 actuating the valves 8 and 9, mechanically associated with these inlet valves 8 and 9 of the reactor 1, respectively.

In the described embodiment electromagnets act as the power drives 10 and 11.

The device for controlling inlet valves of a reactor also comprises two units 12, 13 to control the power drives 10 and 11, respectively. Control units 12 and 13 intended to energize and deenergize the electromagnets at certain instants comprise power amplifiers and thyristor switches (not shown in FIG. 1) employing a well-known parallel-invertor circuit. An output of each of the units 12, 13 is connected to the power drives 10 and 11 actuating the inlet valves 8 and 9. The device for controlling inlet valves of a compression reactor comprises pressure pickups 14, 15, 16, 17. The pickups 14, 15 are arranged in the supply lines 6 and 7, respectively, whereas the pickups 16 and 17 are mounted in the working spaces 5 and 4 of the reactor 1 in close proximity to its bottoms.

Outputs of the pickups 14 and 16, 15 and 17 are connected to comparators 18 and 19, respectively, intended to compare the signals supplied by the pressure pickups 14, 15, 16 and 17. An output of each of the comparators 18 and 19 is directly connected with an input of the respective drive control unit 12, 13, whereas the other output of each of the comparators 18 and 19 is connected with the other input of the respective unit 12, 13 through the time relays 20 and 21. In addition, one of the outputs of one of the comparators 16, 17 (in the given case the output of the comparator 16) is connected with a chronometer 22 which measures the period of repetition of control pulses received from the comparator 18, equal to the reciprocation period of a piston 23. The reactor 1 has exhaust ports 23 for discharging the reacted products from the reactor 1.

FIG. 2 represents time diagrams illustrating the proposed method of controlling inlet valves of a compression reactor and processes occurring in the reactor 1 (FIG. 1).

Herein plotted on the ordinate is time t (FIG. 2) counted from an arbitrary moment of the working cycle of the reactor 1 (FIG. 1). FIG. 2a represents a change-of-sign ("+" or "−") diagram of a pressure differential $\Delta P$, e.g., between the working space 5 (FIG. 1) and the respective supply line 6, where T (FIG. 2a) is the change-of-sign period of $\Delta P$, equal to the reciprocation period of the piston 3 (FIG. 1). FIG. 2b shows the time diagram illustrating changes in the states of the power drive 10 (FIG. 1). An "A" coordinate (FIG. 2b) corresponds to the energized state of the power drive 10 (FIG. 1), whereas a coordinate "0", to the deenergized state thereof. FIG. 2c depicts the time diagram illustrating changes in positions of the inlet valves 8 (FIG. 1) of the reactor 1. A coordinate "B" (FIG. 2c) corresponds to the open state of the valves 8 (FIG. 1), whereas a coordinate "0" (FIG. 2) cooresponds to the closed state.

The method of controlling inlet valves of a compression reactor is carried out with the help of the device described above in the following way.

In the cylindrical body 2 (FIG. 1) of the reactor 1 there reciprocates the piston 3 dividing the reaction chamber into two working spaces, viz., an upper space 4 and a lower space 5. Gaseous reactants are fed into the reactor 1 over the supply lines 6 and 7 through the inlet valves 8 and 9, respectively. Consider first the functioning of the device with the compression reactor 1 operating in an arbitrary mode. In the process of operation of the reactor 1 the pickups 14, 15, 16 and 17 continuously measure the values of pressure in the working spaces 4, 5 and in the supply lines 6 and 7. The comparators 18, 19 compare the signals supplied by the pickups 14, 15, 16 and 17 and determine the sign of the pressure differential $\Delta P$ (FIG. 2) between the upper working space 4 (FIG. 1) and the supply line 7, as well as between the lower working space 5 and the supply line 6.

At the instants the sign of the pressure differential $\Delta P$ (FIG. 2) between one of the working spaces 4 or 5 (FIG. 1) and the respective supply line 7 or 6 changes from "plus" to "minus" the comparators 18, 19 generate control pulses fed to the input of the respective time relay 20 or 21.

At the instants the sign of the pressure differential $\Delta P$ (FIG. 2) changes from "minus" to "plus" the comparators 18, 19 (FIG. 1) produce the control signals fed directly to the control units 12, 13 of the drives 10, 11.

The chronometer 22 measures the change-of-sign period T (FIG. 2) of the pressure differential $\Delta P$ and the relay 20 (FIG. 1) after the preset time interval $\tau$ (FIG. 2) supplies the command to close the inlet valves 8 (FIG. 1) to the control unit 12.

Referring to the diagrams of FIG. 2, consider the operation of the device.

As the control system is symmetrical, for brevity the operation of the device in conjunction with one, e.g., lower working space 5, will be described hereinafter.

Let us begin from an instant $t_1$ (FIG. 2a) when the inlet valves 8 (FIG. 1) are closed owing to the positive pressure differential $\Delta P$ (FIG. 2a) and the power drive 10 (FIG. 1) is deenergized. Gaseous reactants in the lower working space 5 are compressed by the piston 3 to a maximum pressure (e.g., 49.06.10$^4$ Pa) and temperature (e.g., 1500 K.) at which a chemical reaction undergoes. In the upper working space 4 the pressure at the moment equals about 4.10$^4$ Pa, therefore the piston 3 starts moving upwards with a great acceleration. In this case the volume of the lower working space 5 expands, the pressure and temperature drop and the chemical reaction comes to a halt. At an instant $t_o$ (FIG. 2) the pressure in the lower working space 5 (FIG. 1) becomes less than the pressure in the supply line 6. Up to that instant the inlet valves 8 have been free from all forces keeping them in the closed state, except the forces caused by the positive pressure differential $\Delta P$ (FIG. 2a). At the instant $t_o$ when the sign of the pressure differential $\Delta P$ changes from "plus" to "minus" the valves 8 open. The comparator 18 (FIG. 1) at the instant $t_o$ supplies to the time relay 20 a command to read the preset time interval $\tau$ (FIG. 2), where $\tau$ is selected within the range from 0.05 T to 0.3 T, where T is the control pulse repetition period of the comparator 18 (FIG. 1), as measured during the previous cycle of operation of the reactor 1. At the same time, as it was already mentioned, under the action of the negative pressure differential $\Delta P$ (FIG. 2a) the inlet valves 8 (FIG. 1) open into the working space 5 and gaseous reactants start flowing into the working space 5 from the supply line 6. As the preset time interval $\tau$ (FIG. 2) read by the relay 20 (FIG. 1) has expired, the relay 20 feeds to the control unit 12 a command to energize the power drive 10.

For the time $\tau$ (FIG. 2) such amount of gaseous reactants is admitted into the working space 5 (FIG. 1) which occupies the volume approximately equal to the volume occupied by the substances which have already reacted. The inlet valves 8 are closed under the action of the power drive 10 which continues to keep time closed.

At this time the piston 3 continues moving upwards. With the lower end face of the piston 3 reaching the exhaust ports 23, the reacted substances issue from the lower working space 5. While continuing its upward movement the piston 3 compresses the reactants in the upper working space 4 and stops having consumed the whole store of kinetic energy, then starts moving downwards. By the time the piston 3 covers the exhaust ports 23 the issue of the reacted substances has discontinued. While further moving downwards the piston 3 compresses the gaseous reactants in the lower working space 5. At an instant $t_2$ (FIG. 2a) the sign of the pressure differential $\Delta P$ in the lower working space 5 (FIG. 1) change from "minus" to "plus" and the comparator 18 supplies a command directly to the control unit 12 which deenergizes the power drive 10, thereby relieving the inlet valves 8 of action of all the forces keeping them in the closed state; the valves 8 remain closed only because of the positive pressure differential $\Delta P$ (FIG. 2). Then working cycle repeats.

In the upper working space 4 (FIG. 1) the same operations occur as in the lower working space 5, but in antiphase.

Consider next the functioning of the device carrying out the method of controlling the inlet valves of the reactor 1 under transient conditions. The steady operation of the compression reactor 1 is possible only in the case the energy delivered to the piston 3 in the process of supplying the gaseous reactants through the valves 8 and 9 during a cycle is equal to the kinetic energy lost by the piston 3 due to friction, gas leakage, heat transfer, negative heat of the reaction during the same cycle. The equality of energies with the interval $\tau$ (FIG. 2) under the other equal conditions corresponds interval $\tau$ only to one value of the interval $\tau$ (FIG. 2a), therefore, the interval $\tau$ to cause the reactor 1 (FIG. 1) to operate under new conditions determined by the new given value $T_n$, it is necessary to change $\tau$ (FIG. 2) within the range from 0.05 T to 0.3 T. Variation and selection of $\tau$ are performed by means of adjusting the relays 20, 21 (FIG. 1) with the help of the time scale in a ordinary manner. Then it is necessary to measure the value $T_i$ obtained after the steady operation of the reactor 1 has been established. If the obtained value of the period $T_i$ is not equal to the predetermined value of the period $T_n$, it is necessary to repeat the herein described procedure of variation of $\tau$. With $\tau$ (FIG. 2) decreasing, T decreases too, and vice versa.

EXAMPLE 1

In the process of testing the proposed device for controlling the inlet valves of the compression reactor 1 (FIG. 1) under the steady-state conditions the chronometer 22 measured the change-of-sign period T (FIG. 2a) of the pressure differential $\Delta P$, which in the given case was equal to 112 ms. After the preset time interval $\tau = = 14$ ms the relay 20 generated a pulse which was supplied to the control unit 12 of the drive 10 and energized the drive 10.

EXAMPLE 2

The control over the inlet valves of the reactor 1 was carried out in the manner described above, and the parameters T and $\tau$ were selected as in Example 1, i.e., T=112 ms, $\tau$=14 ms. The task was to cause the reactor to operate under conditions characterized by the new value of the change-of-sign period $T_n$ of the pressure differential $\Delta P$. The new predetermined value of the period $T_n$=105±1 ms.

The relays 20 and 21 were manually adjusted to $\tau$=15 ms. Under the conditions established after 10 s the obtained value $T_i$ of the period was measured, where $T_i$=109 ms.

Again $\tau$ was increased up to 16 ms. The obtained value $T_i$ was measured to be equal to 107 ms. $\tau$ was increased up to 17ms and the steady operation of the reactor 1 with $T_i$=106 ms was established. Thus, the obtained value $T_i$ coincided with the predetermined value $T_n$, as required. The procedure took less than two minutes.

An experimental check of the proposed method of controlling inlet valves of a compression reactor and a device for effecting the same has proved the high efficiency thereof. Only utilization of the proposed method and the device effecting the same makes it possible to actually set up in the compression reactor the conditions required for carrying out the chemical reactions.

The proposed method of controlling inlet valves of a compression reactor and the device for effecting the same ensure the reliable operation of the reactor under transient conditions and first of all during starting the reactor. The proposed method and device allow the modes of operation of the reactor to be quickly changed.

INDUSTRIAL APPLICABILITY

The proposed method of controlling a compression reactor and the device for effecting the same may be used in compression reactors of a free-piston type, employed in the chemical and petrochemical industries for carrying out vapour phase processes occurring in such reactors during short time pulses of high pressures and temperatures.

The invention is also applicable to the controlling of the inlet valves of free-piston gas generators.

The sequence of operations inherent in the proposed method of controlling a compression reactor may be applied to the control of outlet valves thereof. The location of the pressure pickups 14, 14, 16, 17 depends in this case on a specific design of the reactor.

The proposed method of controlling a reactor and a device for effecting the same, if slightly modified, may be used to control compressors and internal combustion engines.

We claim:

1. A method of controlling inlet valves of a compression reactor by way of opening and closing the inlet valves which open towards the inside of the compression reactor, characterized in that in the process of operation of the compression reactor 1 the sign of a pressure differential ($\Delta P$) between a working space 4, 5 of the reactor 1 and a respective supply line 7, 6 is determined, at the instant the sign of the pressure differential ($\Delta P$) changes from "minus" to "plus" a command to relieve the inlet valves 8, 9 of all control actions keeping the inlet valves 8, 9 in a closed state is produced, and at the instant the sign of the pressure differential ($\Delta P$) changes from "plus" to "minus" a command to read a preset time interval ($\tau$) within which the inlet valves 8, 9 are open is produced, at the expiration of the preset time interval ($\tau$) a command to close the inlet valves 8, 9 of the compression reactor 1 and to keep them in a closed state is supplied.

2. A method of controlling inlet valves of a compression reactor according to claim 1, characterized in that at the instant the sign of the pressure differential ($\Delta P$) between the working space 4, 5 and the respective supply line 7, 6 changes from "minus" to "plus" the value of a change-of-sign period (T) of the pressure differential ($\Delta P$) is measured, and the value of the preset time interval ($\tau$) is selected within the range from 0.05 T to 0.3 T.

3. A method of controlling inlet valves of a compression reactor according to claim 2, characterized in that in the process of operation of the reactor 1 the value of the change-of-sign period T of the pressure differential ($\Delta P$) is measured, compared with a predetermined value ($T_n$) of the change-of-sign period of the pressure differential ($\Delta P$), determining the new preset steady-state conditions of the reactor 1 and, if said values T and $T_n$ are not equal, the value of the preset time interval ($\tau$) is changed within the range from 0.05 T to 0.3 T, the obtained value ($T_i$) of the period is measured and compared with the predetermined value ($T_n$) of the period until the predetermined value ($T_n$) and the obtained value ($T_i$) of the change-of-sign period of the pressure differential ($\Delta P$) coincide.

4. A device for controlling inlet valves of a compression reactor, comprising at least one power drive actuating the inlet valves of the compression reactor and a drive control unit connected to the power drive and associated with the compression reactor, characterized in that pressure pickups 14, 15, 16 and 17 are arranged in the lower 5 and upper 4 working spaces of the reactor 1 in close proximity to its bottoms and in the supply lines 6 and 7, the outputs of which pickups are connected, via respective comparators 18, 19 and time relays 20, 21 connected in series, to an input of a respective control unit 12, 13 of the drives 10, 11 actuating the inlet valves 8, 9, the other input of each of the control units 12, 13 is directly connected to one of the outputs of the respective comparator 18, 19, while the outputs of the control units 12, 13 are connected to the respective drive 10, 11 actuating the inlet valves 8, 9, one of the comparators 18, 19 being connected to a chronometer 22.

* * * * *